No. 852,582. PATENTED MAY 7, 1907.
W. SCRIBNER.
ELECTROMAGNETIC SWITCH.
APPLICATION FILED DEC. 1, 1905.
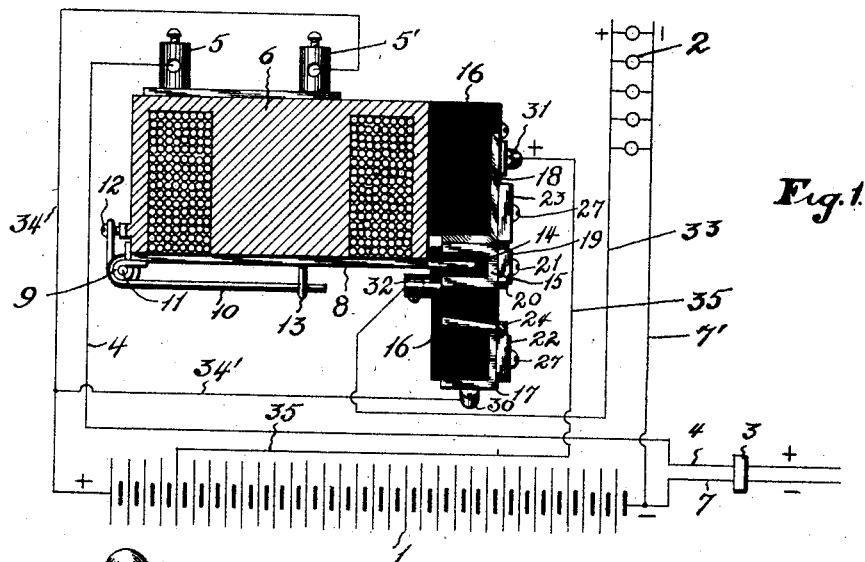
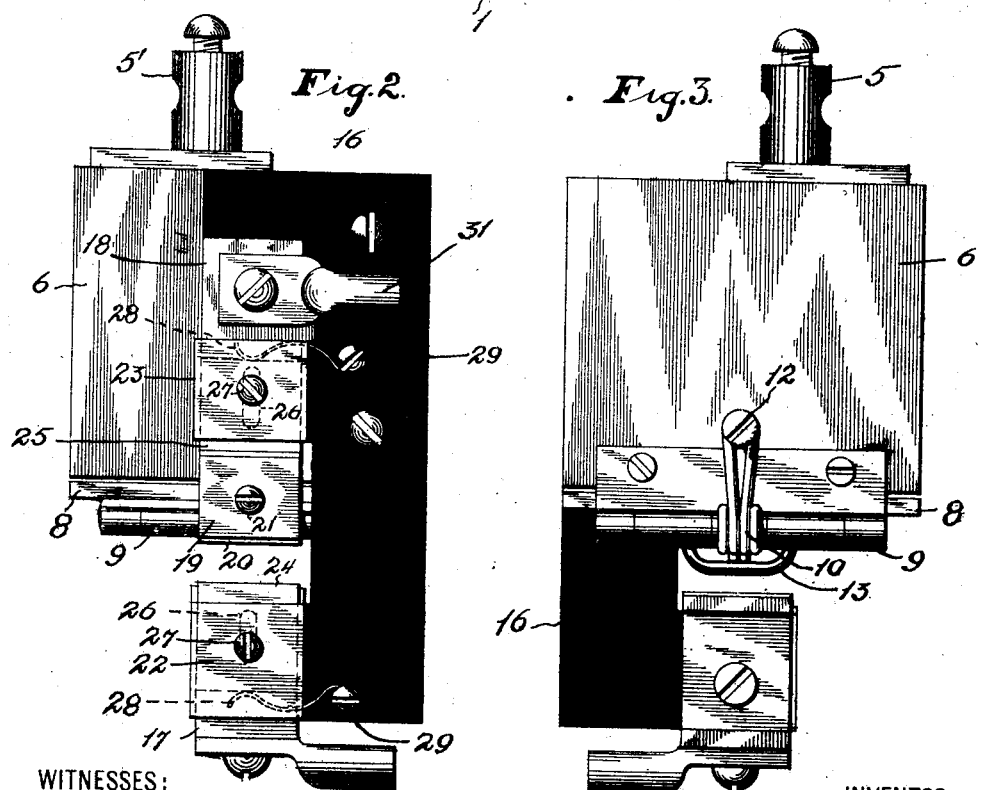
WITNESSES:
Carl Stoughton
INVENTOR
Walter Scribner
BY
ATTORNEYS

UNITED STATES PATENT OFFICE.

WALTER SCRIBNER, OF COLUMBUS, OHIO.

ELECTROMAGNETIC SWITCH.

No. 852,582.	Specification of Letters Patent.	Patented May 7, 1907.

Application filed December 1, 1905. Serial No. 289,912.

*To all whom it may concern:*

Be it known that I, WALTER SCRIBNER, a citizen of the United States, residing at Columbus, in the county of Franklin and State of Ohio, have invented certain new and useful Improvements in Electromagnetic Switches, of which the following is a specification.

My invention relates to new and useful improvements in electromagnetic switches.

It is a well known fact that in order to charge a set of storage batteries, the voltage of the charging current must be higher than that normally given out by the batteries, therefore it is practically impossible to use the current from the batteries while the same are being charged, as the high voltage would burn out the lamps or other devices connected with the batteries. Several methods have been employed for reducing the voltage of the current from a battery or batteries while the same are being charged and the more common of these methods is the use of a suitable resistance material which is objectionable and undesirable.

The object of my invention is to provide an automatic switch which will maintain substantially normal battery or lamp voltage while the batteries are being charged and to accomplish this without the use of resistance materials in the lamp or other circuits which derive their source of power from the storage batteries.

With the above and other objects in view, the invention consists of the novel details of construction and operation, a preferable embodiment of which is described in the specification and illustrated in the accompanying drawings, wherein:

Figure 1 is a side elevation of the device, the electro-magnet being shown in vertical section, and the batteries, lamps and their connections in diagram. Fig. 2 is an end elevation of the device, and, Fig. 3 is an elevation of the opposite end.

In carrying out my invention, as an illustration, we will take thirty-two cells of 280 ampere hour storage batteries connected in series, which give out a maximum of 70.4 volts when fully charged. These cells are indicated in the drawings by the numeral 1. This maximum voltage, however, is not maintained, but drops gradually as the current is used from the batteries until it becomes necessary to charge the same again and in order that the lamps indicated by the numeral 2 may derive about their normal voltage as long as possible, a lamp is usually selected requiring somewhat lower than the maximum battery voltage. In this instance of a set of thirty-two cells of batteries, we will select a lamp voltage of 65. The normal charging rate of this set of 280 ampere hour batteries is 35 amperes, which requires a potential of about 90 to 95 volts on the charging current. Hence it will be readily seen that the potential of 90 to 95 volts required to charge the batteries, would be detrimental to the life of the 65 volt lamps or other apparatus deriving its source of power from the batteries; that is, should it be desired to use the lamps while the batteries are being charged. As hereinbefore stated, various resistance materials have been used in the lamp or other circuits for reducing the voltage while the batteries are being charged.

I will now proceed to describe my invention in detail. It is usual to provide a suitable charging receptacle, which I have indicated by the numeral 3. The lead wires from the dynamo are inserted in this receptacle when it is desired to charge the batteries. From the charging receptacles a positive charging wire 4 extends to the terminal post 5 of a suitable electro-magnet 6, while a negative charging wire 7 extends from the receptacle to the batteries. The electro-magnet 6 as will be apparent forms part of an automatic switch which comprises an armature 8 extending along its underside and suitably connected at its rear end to a hinge 9 fixed on the rear side of the magnet 6 as best shown in Fig. 3. A suitable wire spring 10 coiled about the pintle 11 of the hinge has one end looped about a screw 12 set into the rear face of the magnet 6 and the opposite end extended beneath the armature and engaged in an eye 13 projecting downwardly from said armature. This spring normally tends to swing the armature downward when the batteries are not charging. On its forward end which projects beyond the magnet, the armature 8 carries and is surrounded by a block of fiber or other suitable insulating material 14. A U-shaped contact plate 15 is engaged about the fiber on its upper and lower sides and outer end as clearly shown in Fig. 1. To the side or forward end of the magnet 6 a strip of fiber or other insulating material 16 is secured. This strip projects some distance below the magnet and supports a substantially U-shaped terminal plate 17 directly beneath the contact plate 15. At its upper portion the strip 16 supports an angular terminal plate 18 directly over the contact plate 15. It is thus apparent that the armature 8 may be swung upward to bring its contact plate 15 into engagement with the terminal plate 18 or downward into contact with the terminal plate 17. To prevent arcing between the metal contact plates, I mount on the forward end of the contact plate 15 an open ended housing 19 in which a strip of carbon 20 is rigidly held by a set screw 21. The carbon has such a length as to project slightly above and below the contact plate 15. On the face or ends of the terminal plates 17 and 18, I mount similar housing 22 and 23 in which carbon strips 24 and 25 are mounted to slide. Each of these strips is provided with a central slot 26 indicated in dotted lines through which a set screw 27 is passed from the housings. Flat curved springs 28 are let into the housings having their free ends bearing on the carbon strips 24 and 25 and their fixed ends secured by set screws 29 fastened in an insulating strip 16 as clearly shown in Fig. 2. These springs are arranged so as to tend to force the carbon strip 24 upward and the carbon strip 25 downward and are of light construction so as to yield and permit the carbon strip 25 to be pressed upward when engaged by the strip 20 of the armature and the strip 24 pressed downward when engaged by the said strip of the armature. In this manner when the armature is swung downward, its carbon strip 20 will first engage the carbon strip 24 and force the same downward until the contact plate 15 engages with the terminal plate 17 and likewise when the armature is swung upward, the plates will be pulled apart before the carbons are disengaged as the spring 28 will carry the strip 24 upward the length of the slot 26 before the carbon 20 is disengaged therewith, thus holding the contact until after the plates are pulled apart, thereby preventing arcing between the metal contact plates and detrimental effects. The operation will be the same when the armature is moved down and up. Suitable binding posts 30 and 31 are secured to the terminal plates 17 and 18, while a third binding post 32 is supported by the block of fiber 14 and connected with the contact plate 15.

Having described the details of the automatic switch, I will now proceed to describe the connections and the operation of the same. The lamps 2 are connected with the negative charging wire 7 by a negative wire 7', while a positive wire 33 leads from the lamps to the binding post 32 of the armature contact plate 15. A positive battery wire 34 leads from the batteries to the binding post 5' of the electro-magnet 6. From the positive wire 34 a positive battery wire 34' extends to the binding post 30, while a special positive wire 35 extends from the binding post 31 to the batteries. This special wire is connected to the positive terminal of one of the cells of the batteries. In this instance I have shown it attached to the positive terminal of the fifth cell from the left, which gives sufficient reduction in the voltage for the purposes desired. In explanation of this, it is understood that in charging a set of batteries there is a certain potential drop across each cell. When the batteries are charging at the normal rate of thirty-five amperes, the potential drop across each cell will be three volts; thus by tapping into the fifth cell, a reduction of about fifteen volts will be had.

I will now proceed to describe the operation of my device: Beginning at the charging receptacle 3, it will be noted that the positive current is conveyed by the wire 4 to the binding post 5 through the magnet 6 to the binding post 5' and over the wire 34 which extends therefrom to the batteries 1; from thence to the negative charging wire 7 and the receptacle 3. Of course it will be understood that when the lead wires from the dynamo are first inserted in the charging receptacle 3 the magnet 6 is not charged and therefore the spring 10 will have swung the armature 8 down so that the contact plate 15 is in contact with the terminal plate 17, thus the positive current passing along the wire 34 will also pass along the positive wire 34' to the binding post 30 through the plates to the binding post 32 and over the positive lamp wire 33 to the lamps. After passing through the lamps the current will be carried by the negative lamp wire 7' to the negative charging wire 7 and thus back to the dynamo. However, when the current passes through the magnet 6, the same is charged or energized, so that the armature 8 is drawn upward pulling the contact plate 15 away from the terminal plate 17 and throwing it into contact with the terminal plate 18 in consequence of which the wire 34' becomes idle, while the circuit is closed from the fifth cell through the special wire 35 to the binding post 31 and the terminal plate 18. In this manner the current which passes to the lamp has all the voltage except the first five cells, it being obvious that the current carried by the special wire 35 after passing over the plate 18 passes to the armature contact plate 15, the binding post 32 and by way of the lamp wire 33 to the lamps. It is obvious that the voltage of the current passing to the lamps may be increased by including a greater number of cells or reduced by diminishing the number of cells between the terminal points of the wires 34 and 35. When the charging wires from the dynamo are disconnected from the charging receptacle 3, the electro-magnet 6 will be immediately de-energized so that the spring 10 will swing the armature 8 downward breaking the circuit through the special wire 35 and closing it through the wires 34' and 33 as hereinbefore described.

While the automatic switch forming the present invention has been shown in connection with a lighting system, it is to be understood that it may be used for other purposes if desired.

What I claim, is:

A switch comprising an electro-magnet, an armature arranged to be attracted by said electro-magnet, a contact plate carried upon the outer end of said armature, means for insulating said contact plate from said armature, a carbon strip carried upon the outer face of said contact plate, a fixed contact plate arranged upon one side of the armature, a second fixed contact plate arranged upon the other side of the armature, the contact plate carried by said armature being adapted to contact with one of these fixed contact plates at each limit of its movement, means for connecting an electrical conductor to each of the fixed contact plates and to the contact-plate of the armature, and a carbon strip slidably and yieldingly mounted upon the outer face of each of the fixed contact plates with which the carbon strip carried by the contact plate of the armature is adapted to contact prior to the contacting of the contact plates with each other.

In testimony whereof I affix my signature in presence of two witnesses.

WALTER SCRIBNER.

Witnesses:
  A. L. PHELPS,
  M. B. SCHLEY.